US010999430B2

United States Patent
Grebovic et al.

(10) Patent No.: US 10,999,430 B2
(45) Date of Patent: May 4, 2021

(54) INTELLIGENT USER DEVICE MANAGEMENT IN A MULTI DEVICE ENVIRONMENT

(71) Applicant: Avaya Inc., Santa Clara, CA (US)

(72) Inventors: Dragan Grebovic, Amesbury, MA (US); Mehmet Balasaygun, Freehold, NJ (US); Stephen McIntyre, Kanata (CA)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/354,628

(22) Filed: Mar. 15, 2019

(65) Prior Publication Data

US 2020/0296209 A1 Sep. 17, 2020

(51) Int. Cl.
*H04M 3/42* (2006.01)
*H04M 1/725* (2021.01)

(52) U.S. Cl.
CPC ..... *H04M 3/42042* (2013.01); *H04M 1/7253* (2013.01); *H04M 1/7255* (2013.01); *H04M 1/72552* (2013.01); *H04M 3/42153* (2013.01)

(58) Field of Classification Search
CPC combination set(s) only.
See application file for complete search history.

(56) References Cited

U.S. PATENT DOCUMENTS

| 9,137,382 | B2 | 9/2015 | Silver | |
|---|---|---|---|---|
| 9,503,409 | B2 | 11/2016 | Heiby | |
| 2010/0273510 | A1* | 10/2010 | Herman | B60R 11/02 |
| | | | | 455/456.3 |
| 2013/0016822 | A1* | 1/2013 | Vendrow | H04M 3/02 |
| | | | | 379/211.01 |
| 2014/0331185 | A1* | 11/2014 | Carls | G06F 3/04842 |
| | | | | 715/835 |
| 2015/0181011 | A1* | 6/2015 | Sugahara | H04M 1/6083 |
| | | | | 455/569.2 |
| 2016/0144781 | A1* | 5/2016 | Kleinert | G08B 21/24 |
| | | | | 701/36 |
| 2017/0353693 | A1* | 12/2017 | Semsey | H04M 1/72527 |
| 2018/0020093 | A1* | 1/2018 | Bentitou | H04M 3/4365 |
| 2019/0325288 | A1* | 10/2019 | Oyenan | H04M 3/5116 |

* cited by examiner

*Primary Examiner* — Phung-Hoang J Nguyen
(74) *Attorney, Agent, or Firm* — Sheridan Ross P.C.

(57) ABSTRACT

An incoming communication is received. For example, an incoming voice call is received for a user. A rule is applied to the incoming communication. The rule is based on sensor information associated with the user, presence information associated with the user, and a prior history of handling communications by the user. In response to applying the rule to the incoming communication, a method of notifying the user of the incoming communication is determined. For example, a voice call may be converted to a text communication where the user is notified via text. The incoming communication is routed to a user communication device of the user based on the rule.

20 Claims, 6 Drawing Sheets

INTELLIGENT USER DEVICE MANAGEMENT IN A MULTI DEVICE ENVIRONMENT

FIELD

The disclosure relates generally to communication devices and particularly to using context information for providing notification of and routing of an incoming communication.

BACKGROUND

When a call comes into a user's communication device, the user may not want to be bothered at that time based on his or her activity. All of the user's communication devices may alert at the same time and in the same way, especially when in the same proximity. The user may also opt out of getting any messages by silencing all of the user's devices. There are times when the user wants the call even though the user may be engaged in an activity, but the user may not be able to physically pick up or respond to a device.

Current solutions fall short of being able to properly identify a user's context. For example, an Apple watch may react when in the vicinity of the user's iPhone. However, the Apple watch will still react to an incoming call to the iPhone, even if the iPhone is set to "do not disturb." The current functionality of these devices only provides a limited capability into determining the user's context (e.g., that the devices are in proximity) for properly handing an incoming communication.

SUMMARY

These and other needs are addressed by the various embodiments and configurations of the present disclosure. An incoming communication is received. For example, an incoming voice call is received. The incoming communication is for a user. A rule is applied to the incoming communication. The rule is based on sensor information associated with the user, presence information associated with the user, and a prior history of handling communications by the user. In response to applying the rule to the incoming communication, a method of notifying the user of the incoming communication is determined. For example, a voice call may be converted to a text communication where the user is notified via text. The incoming communication is routed to a user communication device of the user based on the rule.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As defined herein an in the claims a "communication" can be or may include any type of communication, such as, a voice communication, a video communication, an email communication, a text messaging communication, an Instant Messaging communion, a social medial communication, a gaming communication, a virtual reality communication, and/or the like. The communication can be on any user communication device that is associated with the user.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
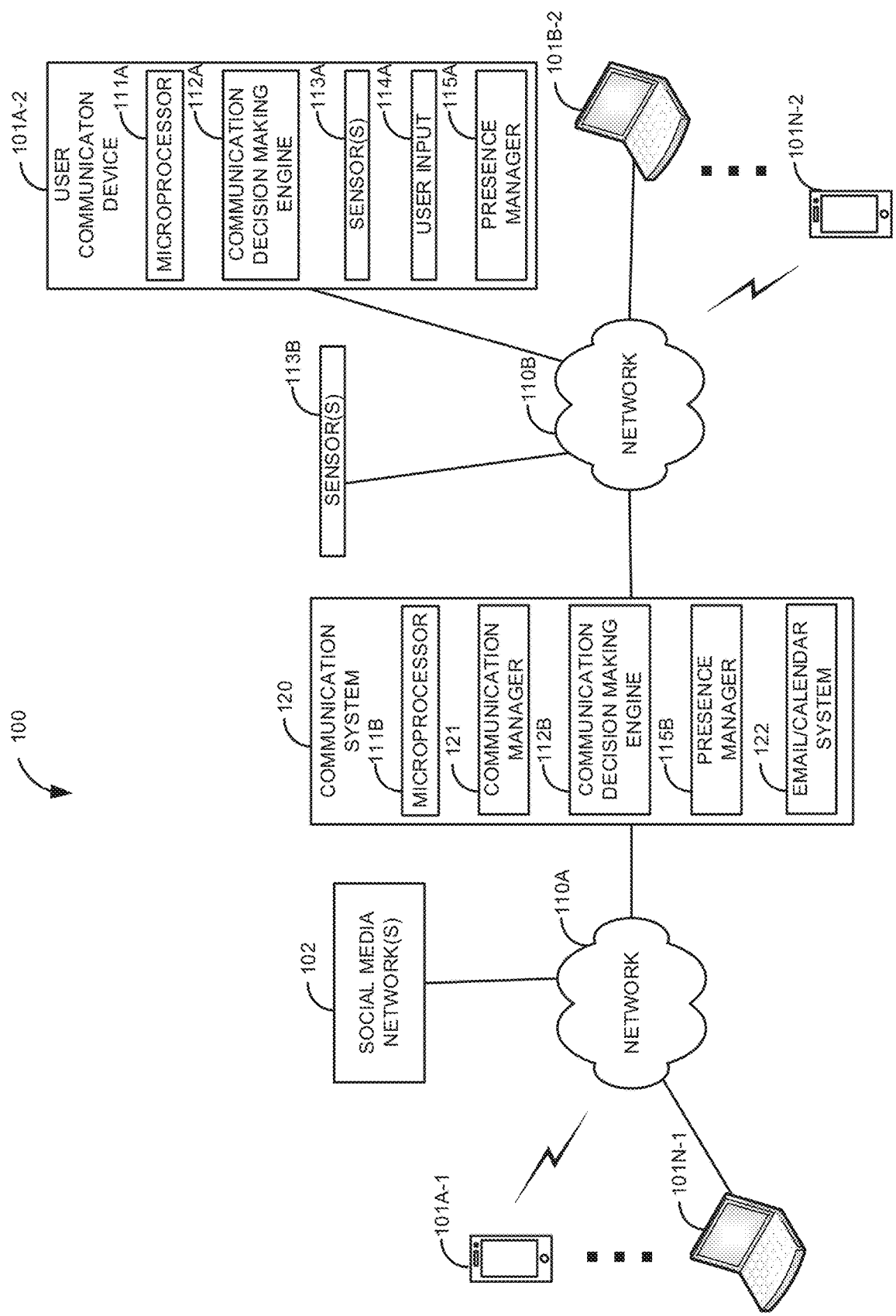
FIG. 1 is an exemplary block diagram of a first illustrative system for intelligent user communication device management.

FIG. 1 is an exemplary block diagram of a first illustrative system 100 for intelligent user communication device 101 management. The first illustrative system 100 comprises user communication devices 101A-1-101N-1 and 101A-2-101N-2, social media network(s) 102, networks 110A-110B, a communication system 120, and sensor(s) 113B.

The user communication devices 101A-1-101N-1 and 101A-2-101N-2 can be or may include any user device that can communicate on the network 110, such as a Personal Computer (PC), a telephone, a video system, a cellular telephone, a Personal Digital Assistant (PDA), a tablet device, a notebook device, a smartphone, and/or the like. As shown in FIG. 1, any number of user communication devices 101A-1-101N-1 and 101A-2-101N-2 may be connected to the networks 110A-110B.

As shown in FIG. 1, the user communication device 101A-2 comprises a microprocessor 111A, a communication decision making engine 112A, sensor(s) 113A, user input 114A, and a presence manager 115A. The microprocessor 111A can be or may include any hardware processor, such as, an application specific processor, a multi-core processor, a microcontroller, and/or the like.

The communication decision making engine 112A can be or may include any hardware/software that can be used to make notifications/routing decisions for any type of incoming communications. The communication decision making engine 112A can make notifications/routing decisions for incoming voice calls, incoming video calls, incoming emails, incoming Instant Messages (IMs), incoming text messages, incoming social media communications (e.g., another user posts a message on the social media network 102), incoming gaming communications, incoming virtual reality communications, and/or the like.

The sensor(s) 113A-113B can be or may include any type of sensor 113, such as, an accelerometer, a video camera, a network sensor (e.g., an antenna), a Radio Frequency Identifier (RFID) sensor, an accelerometer, a temperature sensor, a pressure sensor, an ultrasonic sensor, a proximity sensor, a level sensor, an infrared sensor, an inclinometer, a microphone, and/or the like.

The user input 114A can be or may include any device that can receive input from a user, such as, a microphone, a video camera, a touch screen, a button, a keypad, and/or the like.

The presence manager 115A can be or may include any hardware/software that can be used to determine presence of a user. The presence manager 115A can be used to detect either physical presence and/or virtual presence (e.g., remotely logged into the user communication device 101A-2). The presence manager 115A can detect presence in various ways, such as, based on a video sensor 113, a login, touch screen activity, an established communication session, an accelerometer, and/or the like.

Although not shown for convenience, the elements 111-115 may also reside in the user communication devices 101A-1-101N-1 and 101B-2-101N-2.

The social media network(s) 102 can be or may include any social media network, such as, Facebook™, LinkedIn™, Twitter™, YouTube™, Instagram™, and/or the like. When another user posts on a social media network 102, the post may be considered an incoming communication.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, Internet Protocol (IP), Session Initiation Protocol (SIP), Integrated Services Digital Network (ISDN), H.323, Web Real-Time Communication (WebRTC) protocol, email/calendaring protocols, video protocols, and/or the like. Thus, the networks 110A-110B are electronic communication networks configured to carry messages via packets and/or circuit switched communications.

The communication system 120 can be or may include any hardware coupled with software that can manage various types of communications, such as, a Private Branch Exchange (PBX), a switch, a router, a proxy server, a session manager, and/or the like. The communication system 120 can manage various types of communications, such as, voice communications, video communications, IM communications, email communications, text messaging communications, gaming communications, virtual reality communications, and/or the like. The communication system 120 further comprises a microprocessor 111B, a communication manager 121, a communication decision making engine 112B, a presence manager 115B, and an email/calendar system 122.

The microprocessor 111B can be or may include any hardware processor, such as, an application specific processor, a multi-core processor, a microcontroller, and/or the like.

The communication manager 121 can be or may include any hardware coupled with software that can route and manage communications, such as, a PBX, a switch, a router, a proxy server, a session manager, and/or the like. The communication manager 121 works with the communication decision making engines 112A-112B to route incoming communications.

The communication decision making engine 112B can be similar to the communication decision making engine 112A. In FIG. 1, the communication decision making engines 112A-112B are distributed. However, in one embodiment, the communication decision making engine 112 may only be in the user communication device 101 (e.g., in the user communication devices 101A-1-101N-1 and 101A-2-101N-2) or only in the communication system 120.

The presence manager 115B can be similar to the presence manager 115A. In FIG. 1, the presence managers 115A-115B are distributed. In one embodiment, the presence manager 115B may only reside in the communication system 120 or may reside external to the communication system 120. In one embodiment, the presence manager 115A may only reside in the user communication devices 101.

The email/calendar system 122 can be or may include any hardware coupled with software that can provide email/calendar services, such as, Microsoft's Outlook™. The communication decision making engines 112A-112B can interface with the email/calendar system 122 in order to determine how to notify of and route an incoming communication.

Figure 2:
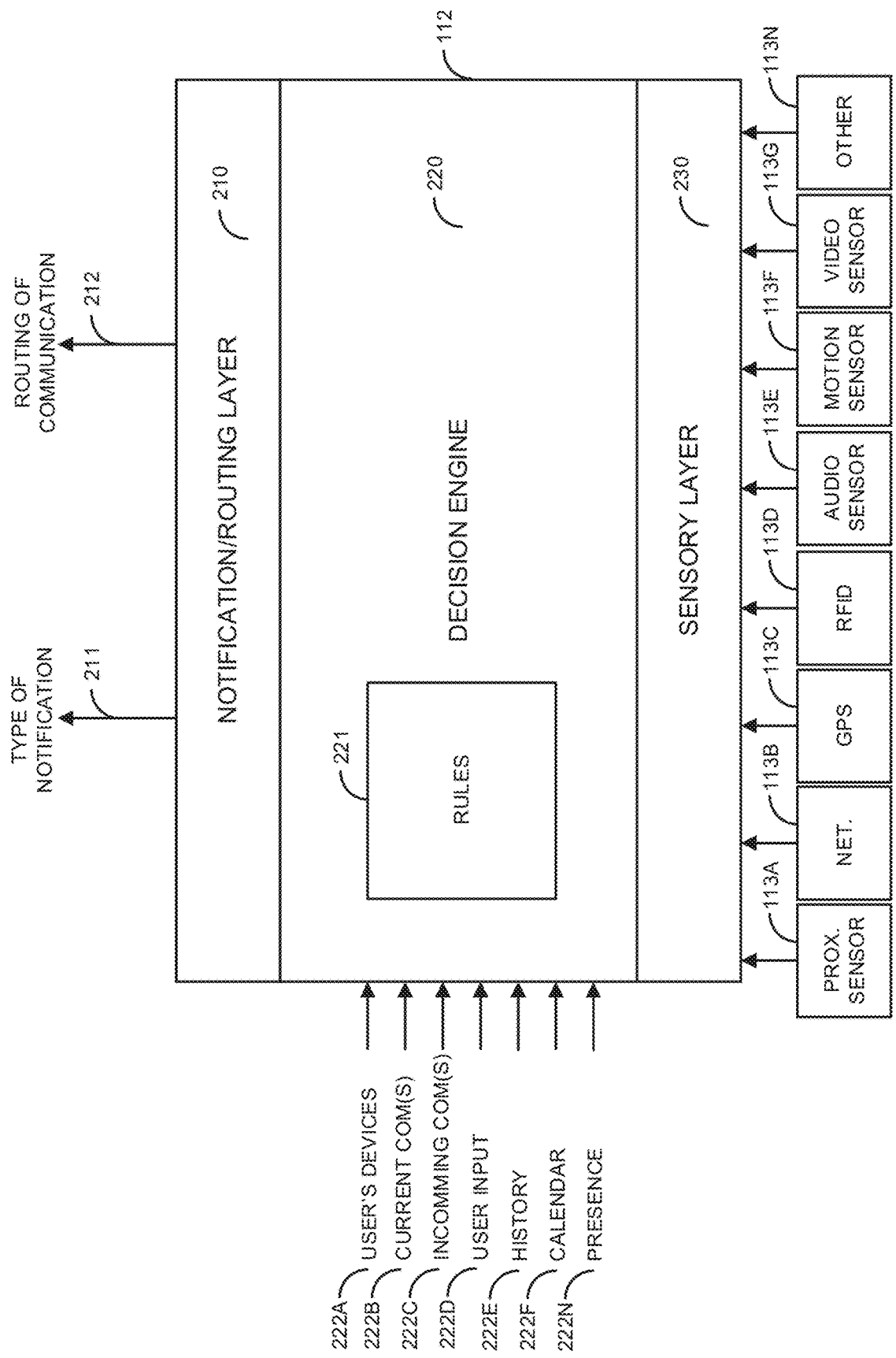
FIG. 2 is an exemplary block diagram of a communication decision making engine.

FIG. 2 is an exemplary block diagram of a communication decision making engine 112. The communication decision making engine 112 comprises a notification/routing layer 210, a decision engine 220, rules 221, and a sensory layer 230. The decision engine 220 receives input data 222A-222N. The input data 222A is input from different user communication devices 101 of an individual user. For example, the user communication devices 101A-2-101N-2 may all be associated with the same user. For example, the user communication devices 101A-2-101N-2 may have a common address of record (e.g., userA@avaya.com). The user communication device 101A-2 may be a desktop telephone, the user communication device 101B-2 may be the user's a laptop computer, and the user communication device 101N-2 may be the user's smartphone. The input data 222A may indicate various types of information associated with the user's communication device(s) 101, such as, tracking information, loaded applications, running applications, login information, connection information, and/or the like.

The current communications input data 222B includes any information about any communications that the user is currently involved in. For example, the current communication input data 222B may include that the user is currently involved in a voice call, a video call, an email communication/text message (e.g., actively responding to an email/text message), an IM session, a social media communication (e.g., the user just received a message that another user has posted a message for the user), a gaming session, a FaceTime™ communication session, a WhatsApp™ communication session, a virtual reality session, a Tweet, a Skype™ session, and/or the like.

The incoming communication(s) input data 222C provides information about any incoming communication(s), such as, who the incoming communication is from, a location of where the incoming communication originated, a number of copied users (e.g., for an email), a media type of the incoming communication (e.g., a text message) and/or the like.

The user input data 222D is based on user input 114A (e.g., from a touchscreen) that can be received to help manage any incoming communication. For example, the user input data 222D may be input from the user to send an incoming voice call to voicemail.

The history input data 222E can be data from a database that provides information for how the customer handled previous communications. For example, if the user always forwards a voice call from Jane Smith to voicemail, the history input data 222E provides this information to the decision engine 220. The history input data 222E can be for any type communication session. For example, the history input data 222E may identify that a user responds to social media posts only after work while responding to incoming voice calls during working hours.

The calendar input data 222F provides scheduling information for users of the user communication devices 101. For example, the calendar input data 222F may indicate that a user is in a meeting, on vacation, traveling, at the store, and/or the like. The calendar input data 222F may be used in conjunction with sensor information to verify an activity/location of a user.

The presence input data 222N is received from the presence manager 115. The presence input data 222N is used to identify which user communication devices 101 where the user is present. For example, if the user owns the user communication devices 101A-2-101N-2, the presence input data 222N will identify if the user is present at any of the user communication devices 101A-2-101N-2. Presence can be determined in various ways, such as, based on input from a camera, input from a touchscreen/keyboard/mouse, a login, input from a microphone, GPS information, and/or the like.

The decision engine 220 also receives sensory information from the sensory layer 230. The sensory layer 230 receives sensor information from the sensors 113A-113N. The sensors 113A-113N may be located in an individual user communication device 101, in multiple user communication devices 101, on the networks 110A-110B, and/or the like. For example, the sensory layer 230 may receive GPS information from GPS sensors 113C in multiple user communication devices 101 of an individual user(s). Alternatively, the sensor information may come from an external sensor 113. For example, the RFID sensor 113D may be external to a user communication device 101.

The proximity sensor 113A determines if a user communication device 101 is in proximity to another user communication device 101. For example, a proximity sensor 113A in the user communication device 101A-2 may detect that the user communication device 101A-1 is in proximity based on a Bluetooth/WiFi direct connection between the two user communication devices 101A-1 and 101A-2.

The network sensor 113B may be used to detect access to different types of networks, such as, WiFi, cellular (e.g., 3G, 4G, 5G, etc.), Bluetooth, Ethernet, and/or the like. The network sensor 113B may detect multiple networks at the same time.

The GPS sensor 113C can be or may include any sensor/software that can be used to gather location information for a user communication device 101. The GPS sensor 113C may comprise multiple GPS sensors 113C in multiple user communication devices 101.

The RFID sensor 113D can be any RFID sensor 113D that can be used to detect an RFID tag. The RFID sensor 113D can be in a user communication device 101 and/or external to the user communication device 101. For example, the user communication device 101 may contain an RFID sensor 113D that can detect when a user enters a specific room or building.

The audio sensor 113E may be any device that can be used to detect an audible sound, such as, a microphone. The audio sensor 113E may be used to detect a voiceprint of a user, movement in a room, noise, background talking (i.e., presence of other users), and/or the like.

The motion sensor 113F can be any device that can be used to detect motion. For example, a user communication device 101 may have an accelerometer to detect when the user communication device 101 is in motion.

The video sensor 113G can be or may include any device that can capture video, such as, a camera. The video sensor 113G may take a picture or a full motion video. The video sensor 113G may be in a user communication device 101 and/or external to the user communication device 101. For example, the video sensor 113G may be an external security camera that can be used to detect presence of a user in a room or building The other sensor 113N can be any type of sensor 113 that can be used to manage an incoming communication, such as a pressure sensor, an altimeter, a door sensor (e.g., detects when a door is opened), a window sensor, a rental scanner, a fingerprint scanner, and/or the like.

The decision engine 220 takes the input data 222A-222N and the sensor data from the sensory layer 230 (from the sensors 113A-113N) and applies the rules 221 to determine how to notify 211 a user of an incoming communication. The decision engine 220 also determines, based on the input data 222A-222N, the data from the sensory layer 230 (from the sensors 113A-113N), and the rules 221 how to route 212 incoming communications.

The decision engine 220, based on the rules 221/input data 222A-222N/sensor information may notify the user of an incoming communication, via the notification/routing layer 210 in various ways. For example, if the incoming communication is a voice call, the decision engine 220 may change the voice call to a text communication (e.g., an IM communication) based a rule 221, a calendar entry 222F that the user is in a meeting, a prior history of how the user handled previous incoming calls from this user, and an audio sensor 113E that detects other people speaking in the meeting. The user is then notified via a text message of the incoming IM communication.

Alternatively, the decision engine 220 may automatically send the incoming audio communication to voicemail (also based on the caller ID (e.g., a history with this user)), along with the calendar entry 222F and audio sensor 113E input). In this example, the user may be notified via text of the voicemail or at a later time when the user is out of the meeting that is defined by the email/calendar system 122 that states that the user is not to be disturbed. The decision engine 220, based on the rules 221/input data 222/sensor information may ignore the audio communication (not route to voicemail), may notify the user (e.g., by ringing), and/or the like.

The decision engine 220 may change a text communication to an audio communication based on the rules 221/input 222/sensor information. The decision engine 220 may route the incoming communication to a different user communication device 101 based on the rules 221/input 222/sensor information. For example, based on the user walking into her office (e.g., being detected by the video sensor 113G), a caller ID, and a rule 221, the decision engine 220 may now change an incoming audio call to the user communication device 101N-2 (a mobile device) to an incoming video call that is directed to the user communication device 101B-2 (a laptop/desktop user communication device 101 with a video camera).

The decision engine 220 may change how an incoming communication is handled based on a setting of a particular application and/or user communication device 101. For example, the user may have defined a rule 221 that states that when the user is in a Skype™ session that he does not want to be notified of other incoming communications (e.g., an incoming Tweet on the same user communication device 101 or a different user communication device 101) while on the Skype session. Once the Skype™ session is over, the user can then be notified of the other incoming communication sessions that occurred during the Skype™ session.

The decision engine 220 may change how a user is notified based on if the user is involved in an existing communication session. For example, if the user is on a voice call that the user has muted and is typing, the decision engine 220 may determine that the best notification option would be to notify the user of the incoming communication via text. As one of skill in the art would envision, any combination of input data 222A-222N and sensor information may be used by the rules 221/decision engine 220 to define how/when a user is notified of an incoming communication 222C along with where the incoming communication is routed.

Figure 3:
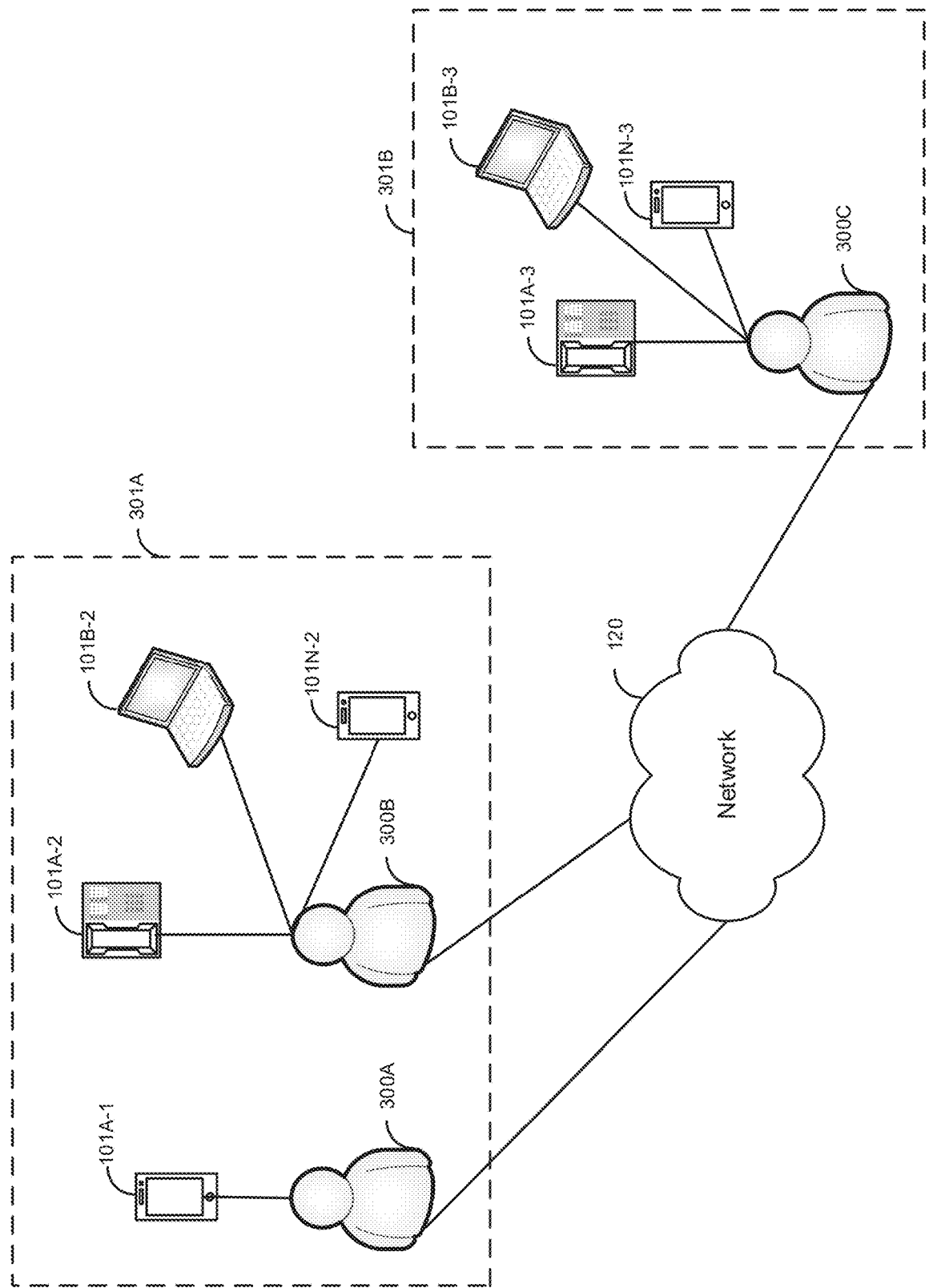
FIG. 3 is an exemplary a block diagram of different contexts that are used to manage user communication devices.

FIG. 3 is an exemplary a block diagram of different contexts that are used to manage user communication devices 101. In FIG. 3, the user 300A is associated with the user communication device 101A-1, the user 300B is associated with the user communication devices 101A-2-101N-2 (e.g., using a single address of record), and the user 300C is associated with the user communication devices 101A-3-101N-3 (e.g., using a single address of record). In FIG. 3, the users 300A-300B are in location 301A. The user 300C is in location 301B.

In FIG. 3, the user communication devices 101A-1 and 101N-2 (mobile devices) are in special proximity to each other. For example, the user communication devices 101A-1 and 101N-1 may determine that they are in special proximity based on a Bluetooth/WiFi direct connection. The user 300 B may have defined a rule 221 that when his user communication device 101N-2 is in special proximity to the user 300A's (user 300B's boss) user communication device 101A-1, that all incoming voice calls go directly to voicemail. If the user 300B moves to the location 301B (not in special proximity), then the incoming voice calls don't go directly to voicemail.

When the users 300A-300C move between the locations 301A-301B, the user's context changes. This allows the decision engine 220 to change how the different users 300A-300C are notified of incoming communications and to which user communication devices 101 that incoming communications are routed. For example, if the user 300B is in location 301A, all incoming voice calls may be directed to the user communication device 101A-2. If the user 300B is not in location 301A, incoming communications may be directed to the user communication device 101N-2 (a mobile device). Similarly, for user 300C, when an incoming video communication is received when the user is in location 301B, the incoming video communication is sent to the user communication device 102B-3 (a desktop computer). If the users leaves the location 301B1, an incoming video communication will be directed to the user communication device 101N-3 (a mobile device). The location information (e.g., GPS sensor 113C) along with other sensor information/input data 222A-222N/rules 221 allow the decision engine 220 to better manage how a user can be notified of and receive incoming communications.

Figure 4:
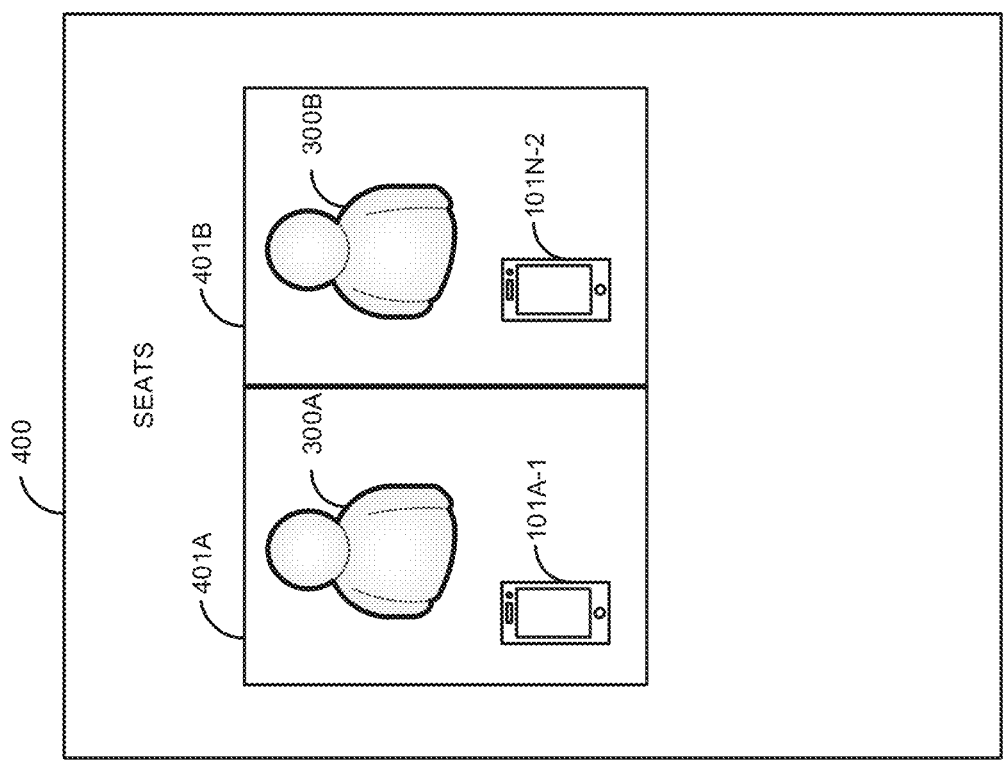
FIG. 4 is an exemplary block diagram of managing different user communication devices in a vehicle.

FIG. 4 is an exemplary block diagram of managing different user communication devices 101A-1 and 101N-2 in a vehicle 400. The vehicle 400 may be any type of vehicle, such as, a car, a truck, a motorcycle, a boat, an aircraft, and/or the like. The vehicle 400 further comprises seats 401A and 401B. Although not shown, the vehicle 400 may comprises additional seats 401.

In FIG. 4, the user 300A is in the driver's seat 401A and the user 300B is in a passenger's seat 401B. In FIG. 4, each user 300A-300B has a defined rule 221 that states that if the user 300 is in the driver's seat 401A (e.g., based on a seat sensor 113, a GPS location, a video camera, an accelerometer, and/or the like), the users 300A-300B can only operate using hands free notifications. If the same user 300 is in the passenger seat 401B, the user may receive incoming communications in any defined manner. For example, the user communication device 101N-2 may receive incoming audio communications where the user 300 manually answers the call by looking at the user communication device 101N-2 and selecting to receive in the incoming call.

The decision engine 220, based on the sensor information, determines that the user 300A is in the driver's seat and is driving. Based on the rule 221, the decision engine 220/user communication device 101A-1 interacts with the vehicle's audio system (e.g., via Bluetooth) to work so that the user 300A can only receive incoming communication (e.g., voice, text, but not video) via a hands-free mode. If a second incoming communication is received for the user 300B, based on the sensor information indicating that the user 300B is in a passenger seat, the second incoming communication is received in the normal manner defined by the user 300B in the rules 221 at the user communication device 101N-2.

Figure 5:
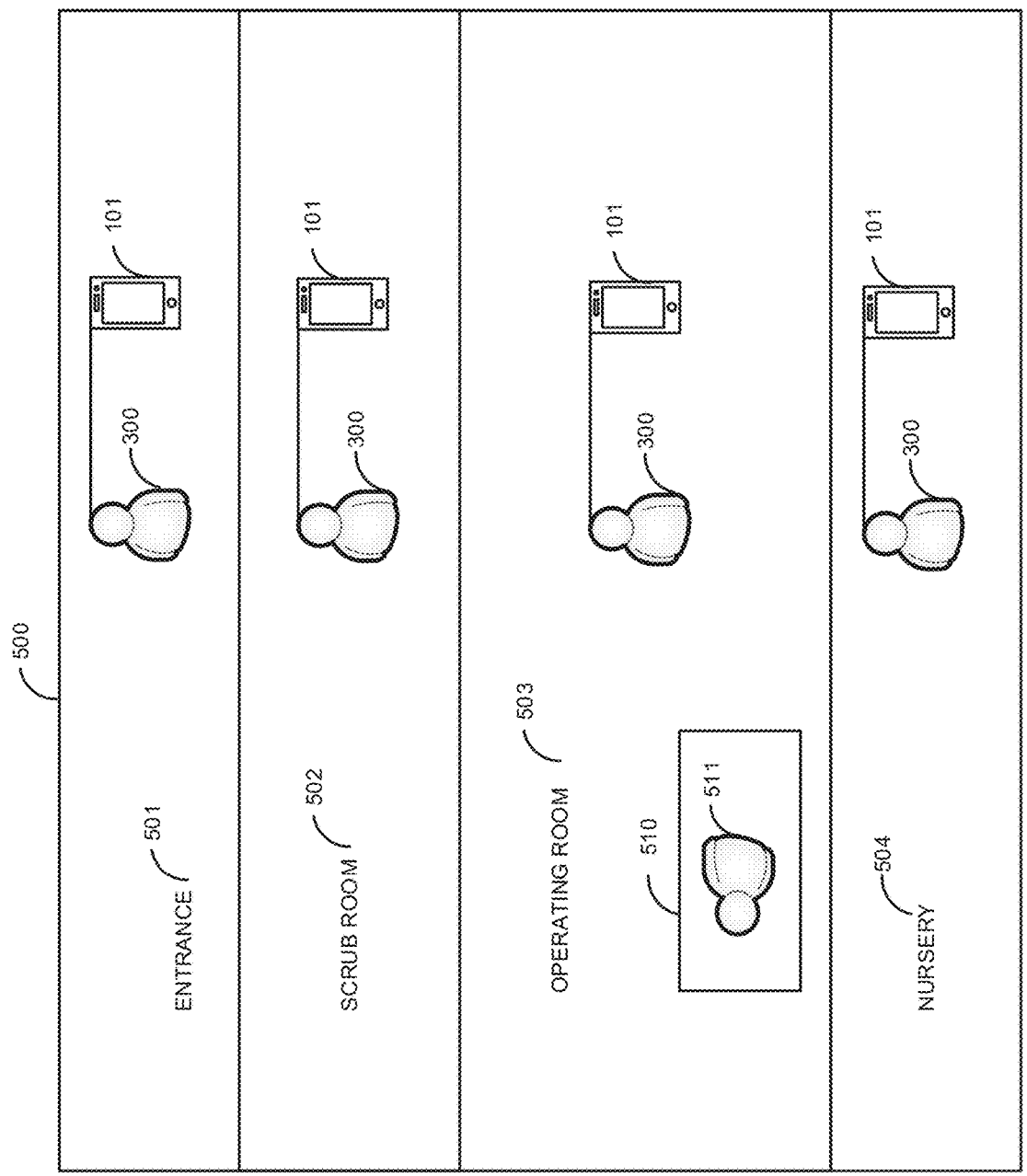
FIG. 5 is an exemplary block diagram of managing a user communication device in multiple contexts.

FIG. 5 is an exemplary block diagram of managing a user communication device 101 in multiple contexts. FIG. 5 is an exemplary illustration of how context is determined based on a location of a user in different rooms in a hospital 500. The different rooms include an entrance 501, a scrub room 502, an operating room 503, and a nursery 504. The operating room 503 includes an operating table 510 and a person 511 who is being operated on. FIG. 5 illustrates how the user 300 moves between the different rooms 501-504 with the user communication device 101.

The user 300 has defined a rule 221 that has the following conditions: 1) when the user 300 is in any room besides the scrub room 502, the operating room 503, and the nursery 504, that the user receives incoming communications in the normal manner. When in the scrub room 502 (e.g., determined by RFID, GPS, etc., even though a calendar event says otherwise), the user 300 cannot touch the user communication device 101. The user 300 has defined a rule 221 that allows the user to use voice prompts when receiving an incoming communication (e.g., a voice call) in the scrub room 502.

If the 300 user is in the operating room 503 and is operating on the person 511, as determined by the sensors 113, the rule 221 defines that the user 300 can only receive a voice call from a specific person (e.g., the ER room) and can only interact using voice prompts. Alternatively, if the incoming communication is from a specific person, the calling person may be notified that the 300 user is in surgery and asks if the incoming call can wait. If the incoming call cannot wait, the incoming call is handled via voice prompts only. Based on the voice prompts, the user 300 may or may not allow the incoming communication.

If the user 300 is in the nursery 504, where voice calls are prohibited, the incoming call may be switched to a text message communication to comply with the rules of the nursery 504. The flexibility of the decision engine 220 can allow any kind of rules 221 to be coupled with the sensory information/input data 222A-222N to allow flexible control for how the user can be notified of and receive incoming communications.

Figure 6:
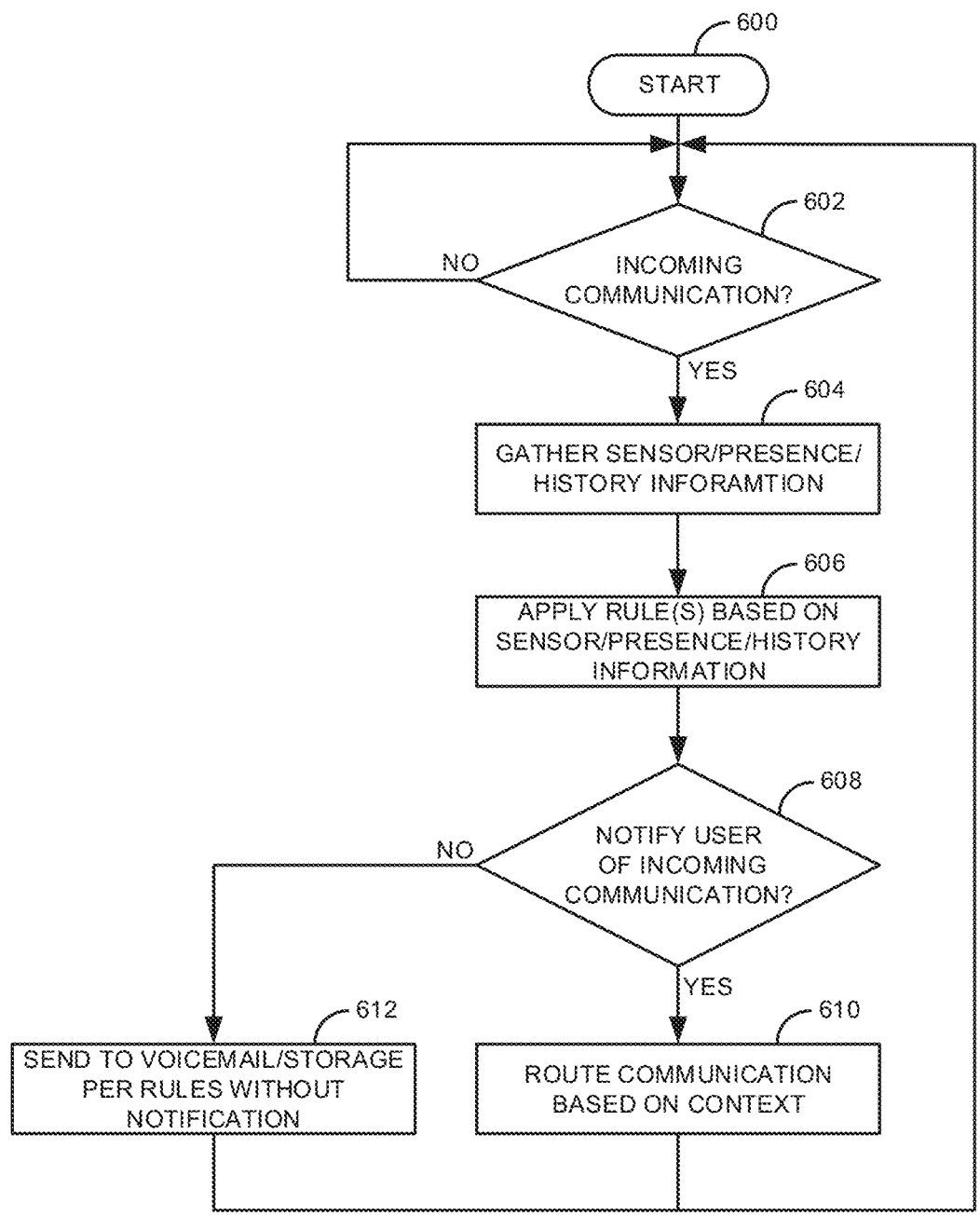
FIG. 6 is a flow diagram of a process for intelligent user communication device management.

FIG. 6 is a flow diagram of a process for intelligent user communication device 101 management. Illustratively, user communication devices 101A-1-101N-1, 101A-2-101N-2, and 101A-3-101N-3, the social media network(s) 102, the communication decision making engines 112A-112B, the sensors 113A-113N, the user input 114A, the presence managers 115A-115B, the communication system 120, the communication manager 121, the email/calendar system 122, the notification/routing layer 210, the decision engine 220, the rules 221, and the sensory layer 230 are stored-program-controlled entities, such as a computer or microprocessor, which performs the method of FIGS. 1-6 and the processes described herein by executing program instructions stored in a computer readable storage medium, such as a memory (i.e., a computer memory, a hard disk, and/or the like). Although the methods described in FIGS. 1-6 are shown in a specific order, one of skill in the art would recognize that the steps in FIGS. 1-6 may be implemented in different orders and/or be implemented in a multi-threaded environment. Moreover, various steps may be omitted or added based on implementation.

The process starts in step 600. The communication manager 121 determines, in step 602, if an incoming communication is received. If an incoming communication is not received in step 602, the process of step 602 repeats. Otherwise, if an incoming communication is received in step 602, the communication decision making engine 112 gathers sensory information, input data 222A-222N (including history input data 222E and presence input data 222N) in step 604.

The communication decision making engine 112 applies the rules 221, based on the sensory information/input data 222A-222N in step 606. The communication decision making engine 112 determines, in step 608, the manner of how to notify the user 300 of the incoming communication. For example, as discussed in FIG. 4, via a hands-free mode if the user is driving. If the user is not to be notified in step 608, the incoming communication is sent to voicemail/storage without notifying the user in step 612. The process then goes to step 602. If the user is to be notified, the notification is routed based on the context (as defined in the rules 221) in step 610. The process then goes to step 602.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
   receive a first incoming communication, wherein the first incoming communication is for a first user;
   apply a first rule to the first incoming communication, wherein the first rule is based on first sensor information associated with the first user, first presence information associated with the first user, and a prior history of handling communications by the first user;
   in response to applying the first rule to the first incoming communication, determine a method of notifying the first user of the first incoming communication; and
   route the first incoming communication to a first user communication device of the first user based on the first rule.

2. The system of claim 1, wherein the first sensor information is different than the first presence information, and wherein applying the first rule to the first incoming communication causes a channel of communication for the first incoming communication to change based on a difference between the first sensor information and the first presence information.

3. The system of claim 1, wherein the method of notifying uses one of at least two channels of communication, and wherein the first sensor information and the first presence information cause the microprocessor to avoid at least one of the channels of communication for the first incoming communication.

4. The system of claim 1, wherein the first incoming communication is received by multiple devices of the first user, the multiple devices comprising the first user communication device, and wherein the method of notifying the first user of the first incoming communication is different between the first user communication device and at least one other of the multiple devices based on the first rule.

5. The system of claim 1, wherein the first sensor information is received from a first vehicle sensor that automatically identifies a location of the first user in a first vehicle, and wherein the method of notifying the first user is based on the location of the first user in the first vehicle.

6. The system of claim 1, wherein the first sensor information is from a first vehicle sensor that identifies that the first user is in a seat of a vehicle, and wherein the method of notifying the first user is based on a type of the seat, and wherein the microprocessor readable and executable instructions further cause the microprocessor to:
   receive a second communication for a second user who is a passenger in the vehicle;
   apply a second rule to the second communication, wherein the second rule is based on second sensor information associated with the second user;
   in response to applying the second rule to the second communication, notify the second user differently from the first user; and
   route the second communication to a second user communication device based on the second rule.

7. The system of claim 1, wherein the microprocessor readable and executable instructions further cause the microprocessor to:
   determine a secondary location of the first user based on at least one of second sensor information and second presence information; and
   changing, based on the secondary location, the method of notifying the first user to at least one of a second user communication device and a different channel of communication.

8. The system of claim 1, wherein the first sensor information comprises multiple sensor information inputs received by the microprocessor prior to the first incoming communication, and wherein the first rule is determined by the microprocessor and is based on an action of the first user that is associated with each of the multiple sensor information inputs.

9. The system of claim 1, wherein the microprocessor readable and executable instructions further cause the microprocessor to:
   receive a second incoming communication for a second user,
   apply a second rule to the second incoming communication, wherein the second rule is based on information associated with the second user; and
   in response to applying the second rule to the second incoming communication, notify the second user differently from the first user.

10. The system of claim 1, wherein the first sensor information identifies a second user communication device in proximity to the first user communication device, wherein the method of notifying the first user of the first incoming communication is based on the second user communication device being in proximity to the first user communication device, and wherein the first user receives communications on the first user communication device and the second user communication device.

11. A method comprising:
   receiving, by a microprocessor, a first incoming communication, wherein the first incoming communication is for a first user;

applying, by the microprocessor, a first rule to the first incoming communication, wherein the first rule is based on first sensor information associated with the first user, first presence information associated with the first user, and a prior history of handling communications by the first user;

in response to applying the first rule to the first incoming communication, determining, by the microprocessor, a method of notifying the first user of the first incoming communication; and routing, by the microprocessor, the first incoming communication to a first user communication device of the first user based on the first rule.

12. The method of claim 11, wherein the first incoming communication is received by a first device, wherein the method of notifying uses one of at least three channels of communication at the first device, wherein at least one of the channels of communication is avoided for the first incoming communication based on the first presence information and wherein at least another one of the channels of communication is avoided for the first incoming communication based on the first sensor information.

13. The method of claim 11, wherein the first sensor information determines an need for hands-free modality of the first user in relation to the first presence information, and wherein the first rule defines the method based on the need for hands-free modality.

14. The method of claim 13, wherein the method is a hands-free mode.

15. The method of claim 11, wherein the first sensor information is from a first sensor that is external to the first user communication device.

16. The method of claim 15, wherein the first incoming communication is a voice call, wherein the first sensor information is from a first vehicle sensor that identifies that the first user is driving a vehicle, and wherein the method of notifying the first user of the first incoming communication is a hands-free notification, and further comprising:

receiving a second voice call for a second user who is a passenger in the vehicle;

applying a second rule to the second voice call, wherein the second rule is based on second sensor information associated with the second user;

in response to applying the second rule to the second voice call, notifying the second user differently from the first user; and routing the second voice call to a second user communication device based on the second rule.

17. The method of claim 11, wherein the first incoming communication is via a first communication channel, and wherein the method of notifying selects a different communication channel for the first incoming communication based on the first rule.

18. The method of claim 11, wherein the first sensor information identifies at least one network and wherein, based on the identified at least one network, the method of notifying the first user of the first incoming communication is changed.

19. The method of claim 11, further comprising:

receiving a second incoming communication for the first user, wherein a method of notifying the first user of the second incoming communication is different from the method of notifying the first user of the first incoming communication based on a change of the first presence information and a proximity to a second user communication device; and routing the second incoming communication for the first user to the second user communication device of the first user.

20. A non-transitory computer readable medium having stored thereon instructions that cause a processor to execute a method, the method comprising:

instructions to receive an incoming communication, wherein the incoming communication is for a user;

instructions to apply a rule to the incoming communication, wherein the rule is based on sensor information associated with the user, presence information associated with the user, and a prior history of handling communications by the user;

instructions to determine a method of notifying the user of the incoming communication in response to applying the rule to the incoming communication; and instructions to route the incoming communication to a user communication device of the user based on the rule.

* * * * *